United States Patent
Takeuchi et al.

[11] 4,066,966
[45] Jan. 3, 1978

[54] ALARM SYSTEM UTILIZING A BIDIRECTIONAL TRANSMISSION LINE IN CATV SYSTEM

[75] Inventors: Takeshi Takeuchi, Yokohama; Hajime Masuda, Tokyo, both of Japan

[73] Assignee: Hochiki Corporation, Tokyo, Japan

[21] Appl. No.: 677,367

[22] Filed: Apr. 15, 1976

[51] Int. Cl.$^2$ .............................. H04B 1/06
[52] U.S. Cl. ........................... 325/308; 340/310 R
[58] Field of Search ............ 325/37, 55, 64, 308, 325/309, 364, 31, 53, 54, 47; 178/DIG. 1, DIG. 13, DIG. 15, DIG. 23; 179/15 FD; 343/225; 340/310 R, 224; 358/86

[56] References Cited

U.S. PATENT DOCUMENTS

| | | | |
|---|---|---|---|
| 2,000,130 | 5/1935 | Espenschied | 179/15 FD |
| 3,342,941 | 9/1967 | Kondo | 179/15 FD |
| 3,794,922 | 2/1974 | Osborn et al. | 178/DIG. 13 |
| 3,840,812 | 10/1974 | Takeuchi | 325/308 |
| 3,996,578 | 12/1976 | Takeuchi et al. | 340/310 R |

*Primary Examiner*—Robert L. Griffin
*Assistant Examiner*—Jin F. Ng
*Attorney, Agent, or Firm*—Haseltine, Lake & Waters

[57] ABSTRACT

In a remote control system especially suitable to use as an alarm system utilizing the bidirectional transmission line of a wired television broadcasting system and including a plurality of low frequency signal transmitters, a plurality of group modulators for modulating high frequency carrier waves by a plurality of groups of low frequency signals from the transmitters to transmit the group modulated waves as super group signals over the transmission line, a plurality of group demodulators for group demodulating the super group signals into group modulated waves of discrete groups, a plurality of detectors for detecting the group signals from the group demodulators to derive out a plurality of low frequency signals, a plurality of resonators each resonating to a predetermined frequency component of the low frequency signals produced by the detectors, and a plurality of controlled apparatus connected to be controlled by the output from respective resonators, there is provided frequency converting means installed on the input side of the group demodulators for converting the super group signals into signals having carrier frequencies lower than the former carrier frequencies of the super group signals.

6 Claims, 10 Drawing Figures

ALARM SYSTEM UTILIZING A BIDIRECTIONAL TRANSMISSION LINE IN CATV SYSTEM

BACKGROUND OF THE INVENTION

This invention relates to a receiving apparatus for a remote control system, more particularly to a receiving system for a remote control system especially suitable for various alarm systems utilizing a bidirectional transmission line of a wired television broadcasting system. (hereinafter termed CATV system)

The applicant has already proposed an alarm system utilizing the CATV system as shown in U.S. Pat. No. 3,840,812. In this system the alarm signals from respective subscriber terminals are sent as low frequency signals by alarm signal transmitters, the low frequency signals are grouped for respective floors of a building or respective street blocks for modulating carrier wave having high frequencies specific to respective floors or street blocks to form up-signals (hereinafter termed group signals) and each group signal is transmitted to a remotely located alarm receiving apparatus as frequency divided multiple signals (hereinafter termed super group signals).

The alarm receiving apparatus is provided with a circuit for discriminating a particular subscriber terminal among a group of subscriber terminals from which the alarm signal has been transmitted, said circuit comprising a group demodulator including a bandpass filter for high frequency carrier waves and a filter for low frequency signals. The group demodulator including the high frequency bandpass filter operates to demodulate the super group signals which have been produced by modulating respective carrier waves by a group of low frequency signals of each generated in respective blocks or floors. Each group demodulator corresponds to each group modulator and the numbers of the group modulators and group demodulators are equal. Each group signal demodulated by the group demodulator corresponds to each block or floor, and the group signal is finally separated into the alarm signals for respective subscriber terminals by low frequency filters.

In the meantime, a CATV system covers a great many subscribers ranging from thousands to hundreds of thousands of households and there must be a great number of control signals to have these many subscribers covered by signals separated for each.

However, when a number of control signals are transmitted by utilizing a bidirectional CATV system, the number of signals transmitted is determined or limited essentially by the capability of signal separation at the receiving end even when the characteristics of the transmission system are not taken into consideration. When the number of subscribers is greater than the limited number of signals, it is impossible to assign control signals to all of the subscribers, part of the subscribers failing to transmit control signals as up-signals. Thus, it becomes difficult to utilize a bidirectional CATV system effectively. Therefore, in order to enhance the usefulness and attain the effective application of a bidirectional CATV system, it is essential to assign control signals to all of the subscribers. Thus it becomes necessary to obtain as many signals as possible within a certain frequency band of up-signals.

Figure 5:
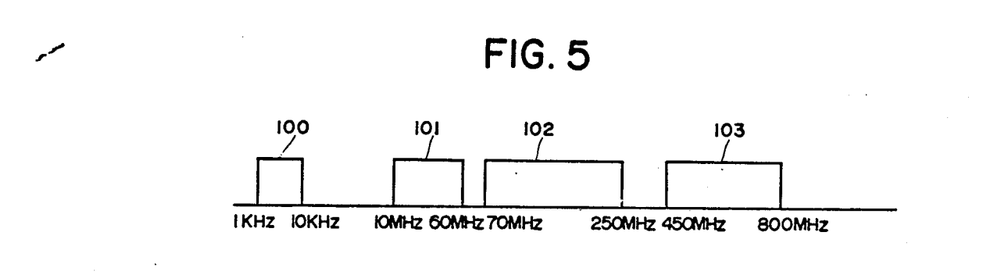
FIG. 5 shows frequency bands used in a remote control system utilizing a CATV system.

For this reason, it is desirable for an increase in the number of control signals that the spacings between adjacent group carrier frequencies of the group modulators should be narrow as far as possible. On the other hand, from the standpoint of signal separation at the receiving end, such spacings should be wide as far as possible thus contradicting to the requirement for the group modulators. Generally, as shown in FIG. 5, the range of the frequencies assigned for a bidirectional CATA system comprises a bandwidth of from 70 MHz to 300 MHz for VHF-TV down-signals sent from the head end, a bandwidth of from 450 MHz to 800 MHz for UHF-TV down-signals sent from the head end and a bandwidth of from 10 MHz to 60 MHz for the up-signals transmitted from the subscribers end. Accordingly, in the alarm system described above in which any bandwidth in the up-signal bandwidth is used as the transmission band for control signals, or the alarm signals, and the high frequency carrier waves in said bandwidth are modulated by the low frequency control signals, ranging from 1 KHz to 10 KHz for example the bandwidth for this purpose is limited in a narrow range in the up-signal bandwidth so that if the spacings are narrowed for increasing the number of control signals in this limited bandwidth the capability of signal separation would be impaired.

In FIG. 5 reference numeral 101 denotes the up-signal frequency band of 10 to 60 MHz, reference numeral 102 the down signal VHF band of 70 to 300 MHz, and reference numeral 103 the down signal UHF band of 450 to 800 MHz. These frequency bands are examples used in a general bidirectional CATV system. Reference numeral 100 shows the control signal band of 1 to 10 KHz.

Figure 1:
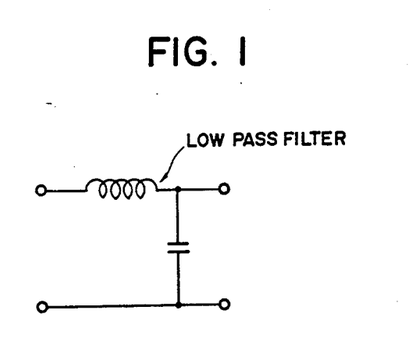
FIG. 1 is a basic circuit diagram of a low pass filter.

Considering now the resolution of the filter provided for the group demodulator for separating the received signals into signals corresponding to respective group carrier frequencies, the amount of alternation $o$ of a low pass filter shown in FIG. 1 is expressed by the following equation.

$$o = \cos h^{-1}\sqrt{1 - (\omega/\omega_1)^2} \quad (1)$$

where $\omega_1$ represents the cutoff frequency, $\omega$ the variable frequency and $o$ a monotonically increasing function. By simplifying equation (1) we obtain equation (2)

$$o = F(\omega/\omega_1) \quad (2)$$

In equation (2), where $\omega = \omega_1 + \Delta\omega$, by representing the amount of attenuation at a frequency $\omega$ by $o'$, we obtain $$o = F(\omega_1 + \Delta\omega)/\omega_1 = F(1 + \Delta\omega)/\omega_1 \quad (3)$$

In equation (3) if $\omega_1$ were very high, $(\Delta\omega/\omega_1)$ would be small. Hence $o'$ would also be small.

Conversely, if $\omega_1$ is very low, $(\Delta\omega/\omega_1)$ and $o'$ will become large.

Accordingly, for a definite frequency spacing $\Delta\omega$, lower $\omega_1$ results in an acuter attenuation characteristic. In other words, it can be noted that signals will be separated satisfactorily when the group carrier frequencies of the group modulators are lowered so as to operate the group demodulators at relatively low frequencies.

Figure 2:
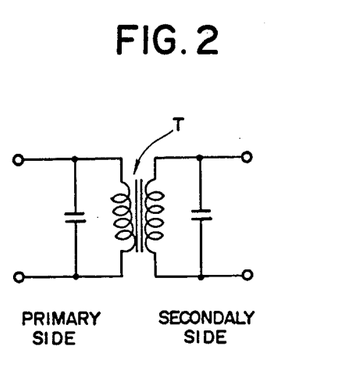
FIG. 2 is a basic circuit diagram of a double resonance circuit.

Further considering the resolution of a double resonance circuit comprising a transformer T of which a primary side and a secondary side are resonated with a predetermined frequency $f_o$ as shown in FIG. 2, the deviation of the transmission gain $A$ with a definite frequency spacing $\Delta f$ is expressed by the following equation.

$$A = 10 \log \{1 + 4(\Delta f \cdot Q_L/f_o)^2\} \quad (4)$$

where $Q_L$ represents the Q factor of the transformer T. In equation (4), where $Q_L$ is constant, if $f_o$ is very high, A will be small. Conversely, if $f_o$ is very low, A will be large. Accordingly, for a definite $\Delta f$, lower $f_o$ results in a larger deviation of transmission gain of transformer T. Hence it also can be noted that signals will be separated satisfactorily as shown in FIG. 1.

However, as described above, as the bandwidth for outgoing signals assigned to the bidirectional CATV system is limited so that it is impossible to lower the transmission frequency thereof to such extent as to effectively improve the separation of the signals.

SUMMARY OF THE INVENTION

Accordingly, it is an object of this invention to provide an improved receiving apparatus for a remote control system capable of improving the separation of the signals thereby increasing the number of signals that can be transmitted in the limited bandwidth.

Another object of this invention is to provide an improved received apparatus for a remote control system capable of enhancing the usefulness of a bidirectional CATV system by assigning control signals to the greatest possible number of subscribers.

A further object of this invention is to provide an improved receiving apparatus for a remote control system capable of utilizing a plurality of bandpass filters or frequency converters respectively of the design that can be produced by mass production technique.

Accordingly to one aspect of this invention, there is provided a receiving apparatus of a remote control system of the class comprising a plurality of low frequency signal transmitters, a plurality of group modulators for group modulating a plurality of group carrier waves of high frequency carrier signals by a plurality of group of low frequency signals from said transmitters to transmit the group modulated waves as super group signals over a transmission line, a plurality of group demodulators for group demodulating said super group signals received from said transmission line into group modulated waves of discrete groups, a plurality of detectors for detecting the group modulated waves received from the group demodulators to derive out a plurality of said low frequency signals, a plurality of resonators each resonating to a predetermined frequency component of the low frequency signals produced by the detectors, and a plurality of controlled apparatus connected to be controlled by the outputs from respective resonators, characterized by frequency converting means installed on the input side of the group demodulators for converting the super group signals transmitted from the group modulators into signals having carrier frequencies lower than the former carrier frequencies of the super group signals.

According to one embodiment of this invention, the frequency converting means comprises a plurality of frequency converters of the same number as the group modulators for producing converted signals having different carrier frequency from another. The frequency converters may be modified to produce converted signals having the same carrier frequency lower than the former carrier frequencies of the super group signals.

According to a modified embodiment of this invention, the frequency converting means comprises a single frequency converter for simultaneously converting the super group signals into a plurality of signals having different carrier frequencies lower than the former carrier frequencies of said super group signals.

According to a modified embodiment of this invention, the frequency converting means comprises a plurality of frequency converters each assigned with a predetermined frequency range in the carrier frequency band of the super group signals for respectively converting the super group signals into a plurality of signals having the same or different carrier frequency lower than the former carrier frequencies of the super group signals in the predetermined frequency ranges.

BRIEF DESCRIPTION OF THE DRAWINGS

In the accompanying drawings.

DESCRIPTION OF THE PREFERRED EMBODIMENTS

Figure 3:
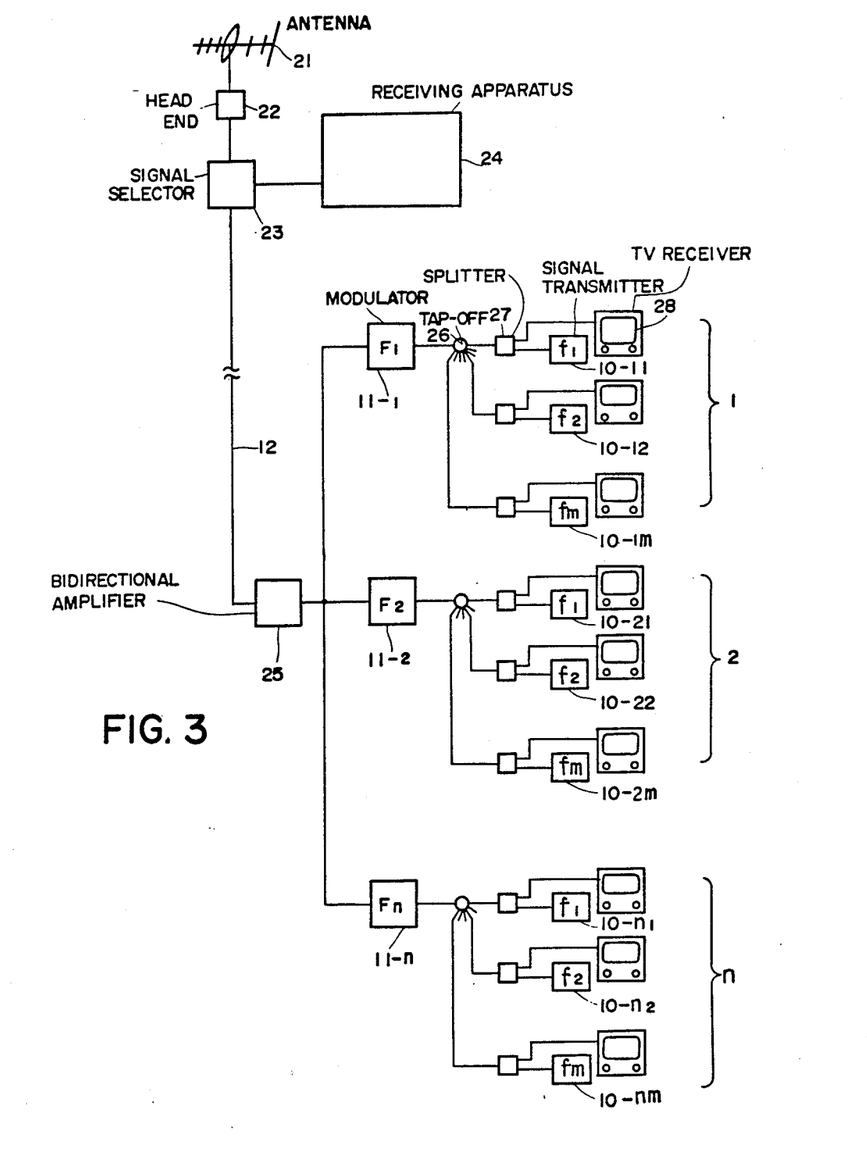
FIG. 3 is a block diagram showing the basic construction of a remote control system utilizing a bidirectional transmission line of a CATV system.

The remote control system provided with the receiving apparatus of the present invention will now be described with reference to FIG. 3. In FIG. 3 reference numeral 21 represents an antenna for receiving electric waves in the air, 22 a head end for controlling and transmitting these electric waves and the down-signals which may be program signals, 23a selector for selecting singals transmitted from group modulators 11-1 through 11-n such as shown in U.S. Pat. No. 3,840,812. Reference numeral 24 is a signal receiving apparatus for receiving the selected signals. For example, the apparatus may be a supervisory station having means for receiving and decoding, which means may be a conventional one used to that end. 25 is a bidirectional amplifier, 26 a tap-off for bridging signals, 27 a signal splitter, 28 a television receiver and 10 a subscriber alarm signal transmitter. The plurality of subscriber alarm signal transmitters 10-11 through 10-nm are arranged in groups (1) through (n) in respective floors of a building or respective street blocks. And each of the transmitters has its own fixed frequency of $f_1$ through $f_m$ whose band is, for example, low or audio frequency band ranging from several Hz to several ten thousand Hz, and the fixed frequency of each of the transmitters has a certain interval disposed therebetween.

The group modulators 11-1 through 11-n are intended for the carrier waves having different frequencies $F_1$ through $Fn$ within a high frequency band, for example, of 10 to 60 MHz. Each of the modulators has its own fixed frequency, and a certain interval of, say, 0.25 MHz is provided between each of the fixed frequencies of the modulator.

When an alarm signal transmitter is operated in the remote control system as described above, its own fixed low frequency is generated to oscillate and modulate the fixed frequency (or high frequency) of the group modulator to which the transmitter belongs and this modulated up-signal is transmitted to the receiving apparatus 24 over a transmission line 12 of a CATV system as a super group of up-signals.

According to the combination of two frequencies of the carrier wave and the modulating wave, the signal receiving apparatus 24 detects and displays which modulator, and in turn which signal transmitter belonging to the modulator has been operated. Consequently, the up-signals are transmitted in a bandwidth determined by the frequencies $F_1$ through $Fn$ of the high frequency carrier waves which are modulated by the signals of low frequencies $f_1$ through $f_m$. Accordingly, by increasing the frequencies $F_1$ through $F_n$ of the carrier waves, it is possible to sufficiently decrease the bandwidth for improving the transmission characteristics.

Figure 4:
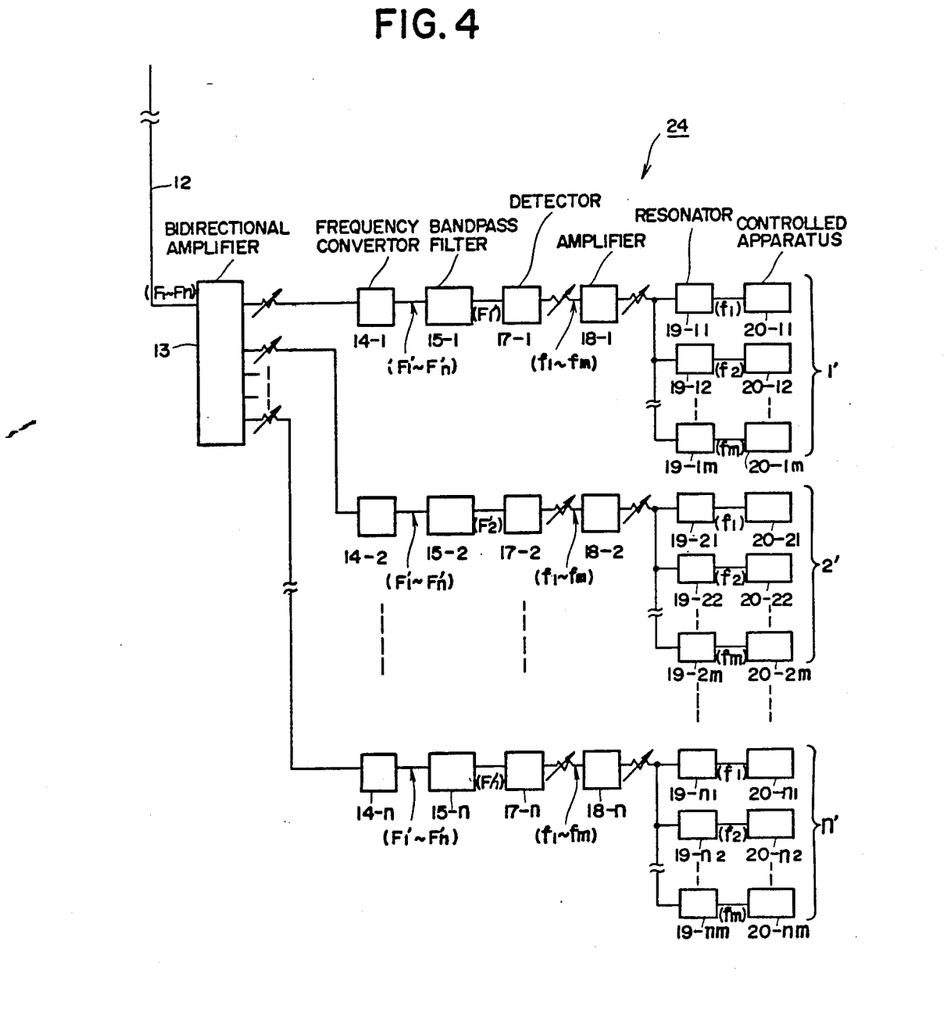
FIG. 4 is a block diagram of the construction of a receiving apparatus according to an embodiment of this invention.

Detailed embodiment of the receiving apparatus of this invention will now be described with reference to FIG. 4. In FIG. 4, the receiving apparatus 24 comprises a plurality of frequency converters $14_{-1}$ through $14-n$ and a bidirectional amplifier (or signal divider) 13 for dividing the super group of the up-signals received from the transmission line 12 among respective frequency converters $14_{-1}$ through $14-n$ of the number corresponding to the number of the group modulators, thereby supplying the super group signals to respective frequency converters $14_{-1}$ through $14-n$ from the amplifier 13 via respective level setters. These frequency converters operate at the same local oscillation frequency for converting the received super group signals into signals having lower frequencies $F_1'$ through $Fn'$. The outputs of the frequency converters $14_{-1}$ through $14-n$ are connected to bandpass filters $15_{-1}$ through $15-n$, respectively, which pass only signal having a frequency corresponding to each of groups $1'$ through $n'$. More particularly, the bandpass filter $15_{-1}$ passes only a converted signal having frequency $F_1'$ corresponding to frequency $F_1$, the bandpass filter $15_{-2}$ passes only a converted signal having frequency $F_2'$ corresponding to frequency $F_2$, and bandpass filter $15_{-2}$ passes only a converted signal having frequency $F_n'$ corresponding to frequency $F_n$. These bandpass filters constitute group demodulators. The output signals from respective bandpass filters $15_{-1}$ through $15_{-n}$ comprise group demodulated signals correspondng to respective signals from respective group modulators $11_{-1}$ through $11_{-n}$, and these group demodulated signals are detected by detectors $17_{-1}$ through $17_{-n}$, respectively for extracting low frequency components $f_1$ through $f_m$ which are supplied to resonators $19-11$ through $19_{-nm}$ having inherent resonance frequencies $f_1$ through $f_m$ respectively for respective blocks via low frequency amplifiers $18_{-1}$ through $18_{-n}$, respectively. Resonators are connected to the controlled apparatus $20_{-11}$ through $20_{-nm}$ respectively which comprise alarm bells or display lamps in the case of a fire alarm system. These controlled apparatus are grouped into blocks $1'$ through $n'$ corresponding to the blocks 1 through $n$ on the subscriber's end. Respective controlled apparatuses are operated respectively by the outputs of the associated resonators, that is, selectively operated by signals having corresponding low frequencies in respective blocks.

In this embodiment, as described above the super group signals are converted into low frequency signals by the frequency converters $14_{-1}$ through $14_{-n}$ prior to the group demodulation, which results in that the frequency separating characteristics of the bandpass filters $15_{-1}$ through $15_{-n}$ acting as the group demodulators are improved. Consequently, it is possible to make small the spacing between the frequencies of adjacent group carrier waves of the group modulators thus making it possible to increase the quantity of the signals transmitted in the same bandwidth. Moreover, as all frequency converters have the same local oscillation frequency it is possible to manufacture them by mass production technique.

For example, where said $f_1 - f_m$ is selected from the frequency band of 1 KHz - 10 KHz, said $F_1 - F_n$ is selected from the band of 10 MHz - 16 MHz, said bandpass filter has a construction of a three-stage circuit of the double resonance circuit as shown in FIG. 2 and the deviation in the gain of signals which can be separated by said filter is set at 30db, if frequency conversion is not carried out, the value of A in equation (4) will be 10 db (30/3) (assuming that $Q_L$ equals 48) and therefore $\Delta f$ in the vicinity of 16 MHz where frequency separation is most difficult will be about 0.5 MHz, with the result that only 13 channels can be utilized throughout said band. On the other hand, if 7 MHz is selected as local oscillation frequency and $F_1 - F_n$ is converted, frequencies ranging between 3 MHz and 9 MHz are obtained as $F_1' - F_n'$. If, in this case, the value of $fo$ is 9 MHz, equation (4) gives 0.28 MHz as the value of $\Delta f$, thus making it possible to obtain 22 channels from the same bandwidth.

In other words, supposing that one channel covers 100 subscribers, 900 more subscribers can be covered by the system. Since it is practically possible to use the entire bandwidth between 10 MHz and 60 MHz as shown in FIG. 5, frequency conversion makes it possible to assign control signals to a far more subscribers than in the absence of frequency conversion.

Figure 6:
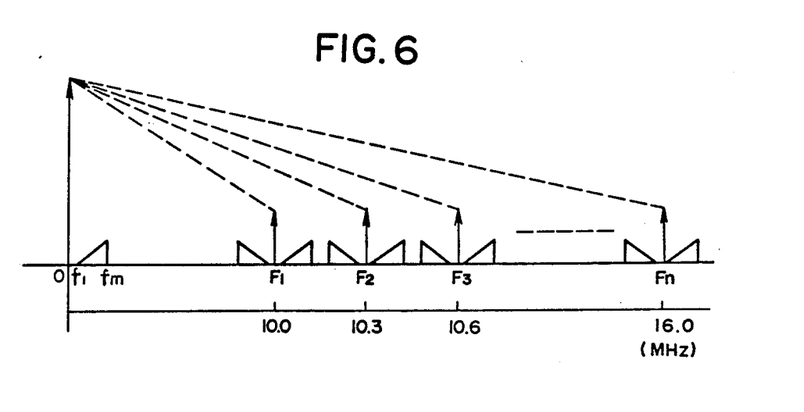
FIG. 6 shows frequency spectrum of up signals according to an embodiment of this invention.

The number of subscribers covered by one channel is determined by the quantity of signals obtained by dividing the low frequency control signals of 1 KHz - 10 KHz by a spacing not affected by higher harmonics, e.g. a spacing of 20 Hz through 100 Hz. Thus, it is possible to increase said number of subscribers to 100 or more. FIG. 6 shows frequency spectrum of up-signals based on a conservative $\Delta f$ value of 0.3 MHz.

Figure 7:
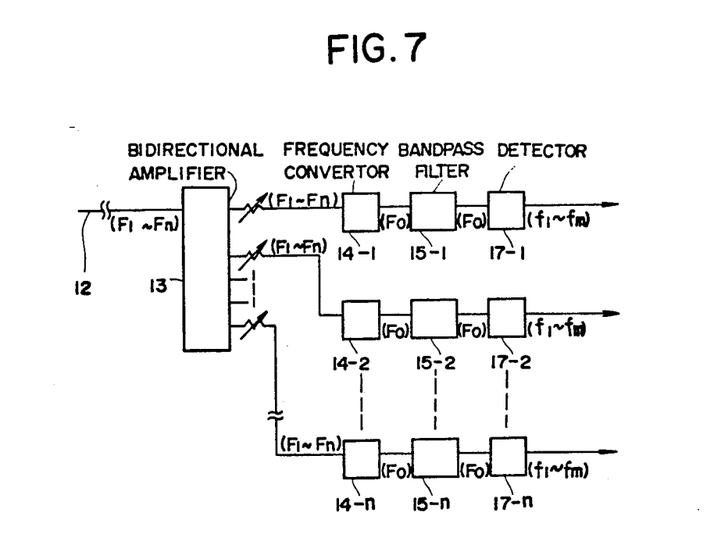
FIG. 7, 8, 9 and 10 are block diagrams showing respectively the construction of the receiving apparatus according to the embodiment of this invention.

FIG. 7 is a block diagram of a modified embodiment of this invention in which elements corresponding to those shown in FIG. 4 are designated by the same reference numerals.

In this embodiment, the frequency converters $14_{-1}$ through $14_{-n}$ are designed to operate at different local oscillation frequencies so as to produce by these frequency converters converted outputs having the same frequency Fo lower than the carrier wave frequencies of the super group signals whereby in addition to the advantage of increasing the quantity of the transmitted signals caused by the improvement in the separation characteristic, there is an advantage of making all bandpass filters $15_{-1}$ through $15_{-n}$ act as the group demodulators to have the same band pass frequency, hence suitable for mass production.

Figure 8:
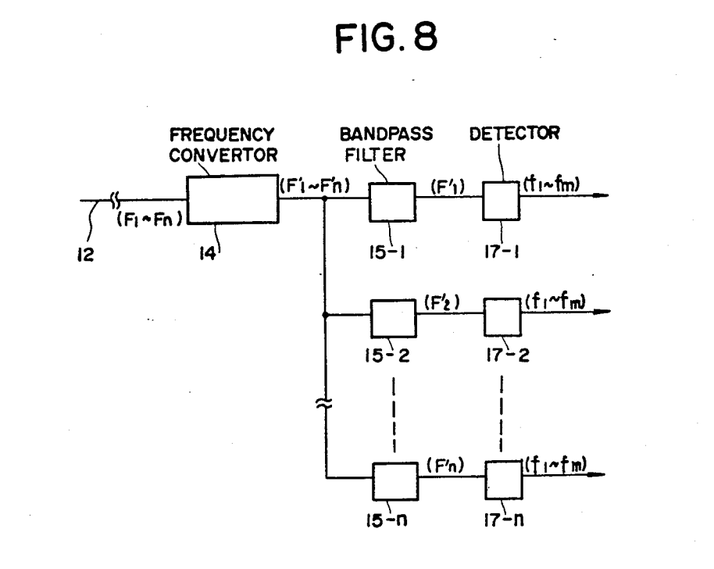

FIG. 8 shows another embodiment of this invention in which elements corresponding to those shown in FIG. 4 are designated by the same reference numerals.

In this embodiment, there is provided a frequency converter 14 adapted to convert simultaneously the super group signals transmitted over the transmission line 12 into signals having frequencies $F_1'$ through $F_n'$ lower than the carrier frequencies $F_1$ through $F_n$. The outputs from the frequency converter 14 are group demodulated by bandpass filters $15_{-1}$ through $15_{-n}$ which pass only the corresponding frequency components $F_1'$ through $F_n'$, respectively. For this reason, in this embodiment, a wide band frequency converter is used as the frequency converter 14 for simultaneously converting the super group signals into signals having lower frequencies which are then subjected to the group demodulation. Thus, this embodiment not only can increase the quantity of the signals transmitted in the same bandwidth but also requires only one frequency converter, thus eliminating the signal divider.

Figure 9:
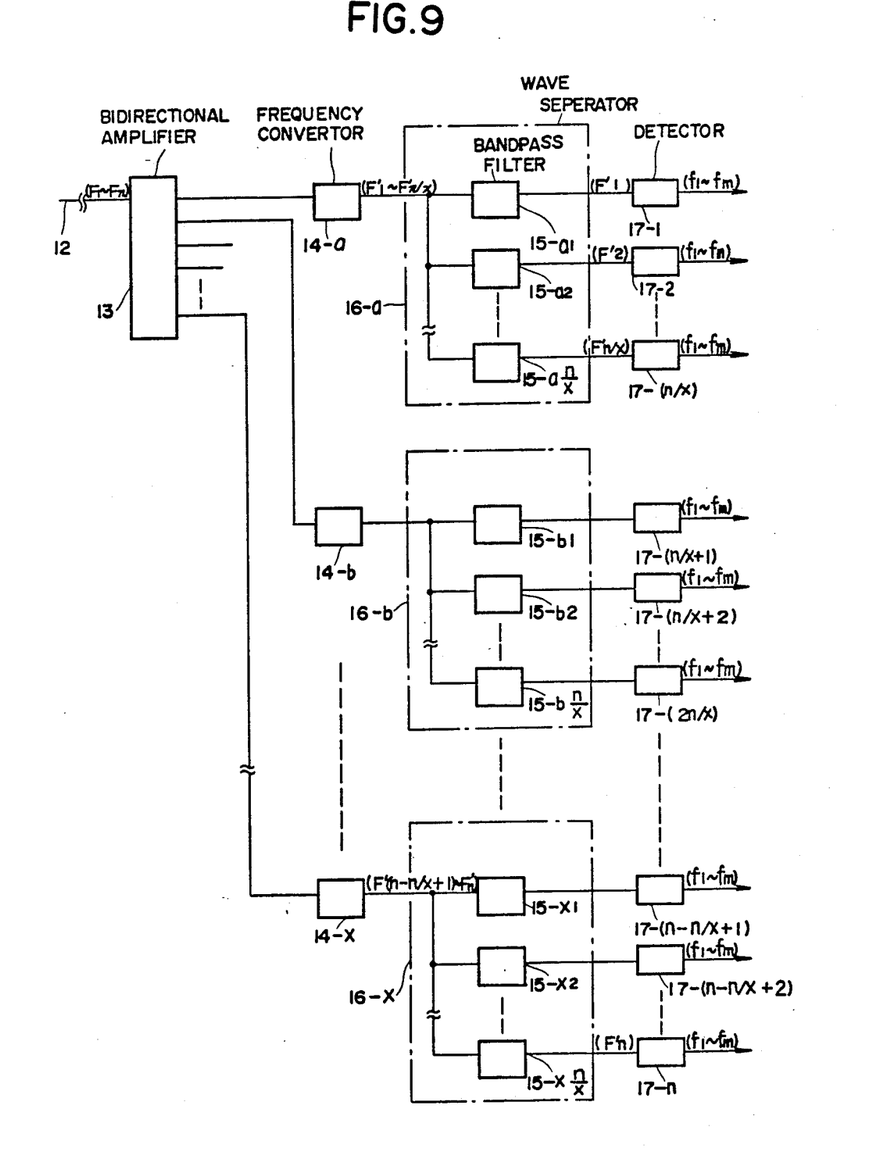

FIG. 9 shows still another embodiment of this invention. Again, elements corresponding to those shown in FIG. 4 are designated by the same reference numerals.

In this embodiment, the group of the super group signals transmitted over the transmission line 12 and containing frequency components $F_1$ through $F_n$ divided into X sets by the action of an amplifier 13 and applied to frequency converters $14_{-a}$ through $14_{-x}$ respectively. A predetermined frequency band is assigned to each set. For example, where the frequency band of the super group signals are divided into X equal frequency bands, each set is assigned with a frequency band $F(n/x)$. The frequency converter $14_{-a}$ functions to simultaneously convert the frequency components of from $F_1$ to $F(n/x)$ among the super group signals into signals having lower frequencies $F_1'$ through $F'(n/x)$ and these low frequency signals are separated into group signals having frequencies of $F_1'$ through $F'(n/x)$ by a wave separator $16_{-a}$ comprising $(n/x)$ bandpass filters $15_{-a1}$ through $15_{-a(n/x)}$. ). In the same manner, the frequency converter $14_{-x}$ functions to simultaneously convert the frequency components of from $F(n-(n/x)+1)$ to $F_n$ among the super group signals into signals having lower frequencies of from $F'(n-(n/x)+1)$ to $F_n'$ which are separated into group signals having frequencies of from $F'(n-(n/x)+1)$ to $F_n'$ by the action of a wave separator $16_{-x}$ comprising $(n/x)$ bandpass filters $15_{-x1}$ through $15_{-x(n/x)}$. Accordingly, in this embodiment the frequency converters $14_{-a}$ through $14_{-x}$ may be of the same design having the same local oscillation frequency, and the number of the frequency converters is equal to the number X with which the frequency band of the super group signals is divided. The wave separators $16_{-a}$ through $16_{-x}$ constitute group demodulators of the same number as the frequency converters. Each wave separator comprises $n/x$ bandpass filters for $x$ group signals. As shown in the drawing, the group signals from bandpass filters of each wave separator are supplied to detectors $17_{-1}$ through $17_{-n}$ for deriving out low frequency components $f_1$ through $f_n$.

In this embodiment, prior to the group demodulation, the super group signals are converted into signals of lower frequencies allotted for respective blocks by frequency converters $14_{-a}$ through $14_{-x}$ assigned with predetermined bandwidth. As a consequence, the separation characteristics of respective bandpass filters acting as the group demodulators are improved so that the spacings between the group carrier frequencies of the group demodulators can be made narrower thereby increasing the quantity of the signals transmitted in the same bandwidth. Moreover, as the all frequency converters have the same local oscillation frequency they are suitable for mass production. Further, even when the entire bandwidth of the super group signals is wide as the bandwidth is divided into a plurality of narrow bandwidths and the signals therein are separately frequency converted, it is possible to process signals in a wide bandwidth with a relatively small number of frequency converters.

Figure 10:
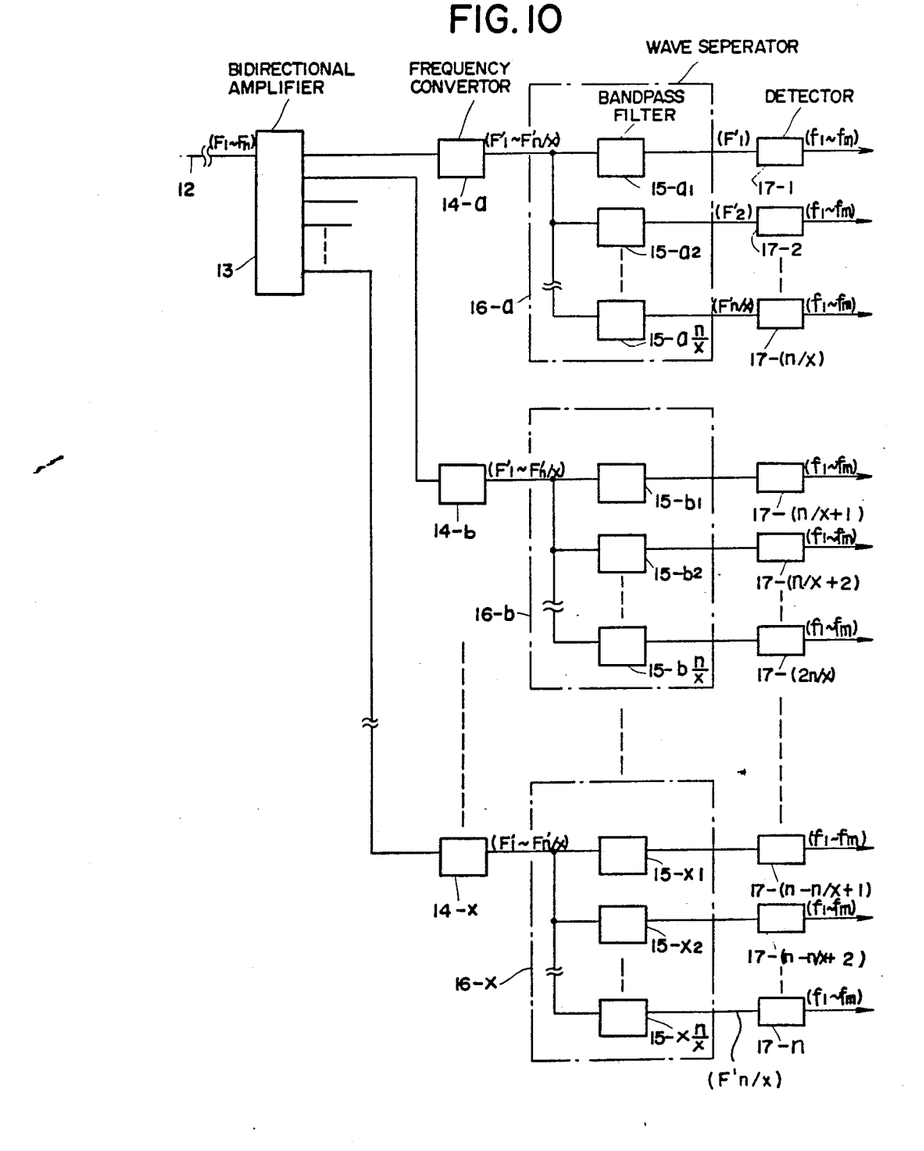

FIG. 10 shows still another modification of this invention in which elements similar to those shown in FIGS. 4 and 9 are designated by the same reference numerals. In this embodiment the frequency converters $14_{-a}$ through $14_{-x}$ shown in FIG. 9 are made to have different local oscillation frequencies whereas the outputs from various frequency converters are made to have frequencies in the same range of from $F_1'$ to $F_{(n/x)}'$, ), for example. Accordingly, in this embodiment too the wave filters $16_{-a}$ through $16_{-x}$ may comprise identical bandpass filters suitable for mass production.

As has been described hereinabove, according to this invention, in a control system utilizing the bidirectional transmission circuit of a CATV system, it is possible not only to increase the number of control signals transmitted in a transmission band of a limited bandwidth but also to separate the signals at high accuracies. Moreover, as the bandpass filters of wave separators or frequency converters have the same construction, it is impossible to prepare them by mass production technique.

What is claimed is:

1. A subscription alarm system having locations in group units, utilizing a bidirectional transmission line of a wired television broadcasting system, said system employing a plurality of alarm signal generators located at the subscribers' locations, generating low frequency alarm signals of frequencies common to the respective group units, said frequencies being different for subscribers in given respective group units, each of said alarm signal generators being provided for each subscriber including:

modulator for each of said respective group units, for modulating the low frequency alarm signals of said alarm signal generators with different high frequency carrier signals;

a receiving means coupled to the respective modulators through said bidirectional transmission line, for receiving said modulated alarm signals, said receiving means comprising frequency converting means for converting modulated alarm signals transmitted from said modulators into signals having lower frequencies than the carrier frequencies of said modulated alarm signals, a plurality of band-pass filters for dividing said modulated alarm signals from said frequency converting means into modulated alarm signals for respective subscriber groups, a plurality of detectors for demodulating said modulated alarm signals from said band-pass filters and extracting therefrom alarm signals for respective subscriber groups, a plurality of resonators for separating an alarm signal for each subscriber from said alarm signals of said detectors, and a plurality of alarm indicators for responding to each alarm signal from each of said resonators.

2. An alarm system according to claim 1, wherein: said frequency converting means comprises a plurality of frequency convertors of the same number as said group modulators for producing converted signals having different carrier frequencies from one another lower than the carrier frequencies of said modulated alarm signals.

3. An alarm system according to claim 1 wherein said frequency converting means comprises a plurality of frequency convertors of the same number as said group modulators for producing converted signals having the same carrier frequency lower than the former carrier frequencies of said modulated alarm signals.

4. An alarm system according to claim 1, wherein: said frequency converting means comprises a single frequency converter for producing converted signals having carrier frequencies lower than the former carrier frequencies of said modulated signals.

5. An alarm system according to claim 1, wherein: said frequency converting means comprises a plurlaity of frequency converters each assigned with a predetermined frequency range in the carrier frequency band of said modulated alarm signals, whereby said frequency converters producing converted signals having carrier frequencies different from one another and lower than the carrier frequencies of said modulated alarm signals.

6. An alarm system according to claim 1, wherein: said frequency converting means comprises a plurality of frequency converters each assigned with a predetermined frequency range in the carrier frequency band of said modulated alarm signals, said frequency converters producing converted signals having the same carrier frequency with one another lower than the carrier frequencies of said modulated signals.

* * * * *